United States Patent
Lindsay et al.

(10) Patent No.: US 7,206,719 B2
(45) Date of Patent: Apr. 17, 2007

(54) DIAGNOSTIC METHOD FOR PREDICTING MAINTENANCE REQUIREMENTS IN ROTATING EQUIPMENT

(75) Inventors: William Lindsay, Hamilton (CA); Kevin G Hunt, Hamilton (CA); James F Stulen, Brantford (CA)

(73) Assignee: Dofasco Inc., Hamilton, Ontario (CA)

( * ) Notice: Subject to any disclaimer, the term of this patent is extended or adjusted under 35 U.S.C. 154(b) by 0 days.

(21) Appl. No.: 10/563,808

(22) PCT Filed: Jul. 7, 2004

(86) PCT No.: PCT/CA2004/000992

§ 371 (c)(1),
(2), (4) Date: Jan. 9, 2006

(87) PCT Pub. No.: WO2005/003874

PCT Pub. Date: Jan. 13, 2005

(65) Prior Publication Data

US 2006/0178854 A1    Aug. 10, 2006

(30) Foreign Application Priority Data

Jul. 7, 2003    (CA) .................................... 2434735

(51) Int. Cl.
*G06F 15/00* (2006.01)

(52) U.S. Cl. ................ 702/177; 702/182; 702/183; 702/33; 324/772; 324/635; 324/683; 73/660; 73/570; 73/862.08; 73/649

(58) Field of Classification Search ............... 702/177, 702/182, 56, 184, 183, 130, 185, 34, 35, 702/168, 186, 33; 73/660, 862.08, 649, 53.05, 73/61.41, 54.02, 10, 53.01, 23.31, 1.02, 54.01, 73/570; 324/772, 117 H, 635, 683
See application file for complete search history.

(56) References Cited

U.S. PATENT DOCUMENTS

| | | | |
|---|---|---|---|
| 4,758,964 A | | 7/1988 | Bittner et al. |
| 4,980,844 A | | 12/1990 | Demjanenko et al. |
| 5,094,107 A | | 3/1992 | Schoch |
| 5,210,704 A | * | 5/1993 | Husseiny ..................... 702/34 |
| 5,523,701 A | | 6/1996 | Smith et al. |
| 5,602,757 A | | 2/1997 | Haseley et al. |
| 5,875,420 A | | 2/1999 | Piety et al. |
| 5,922,963 A | * | 7/1999 | Piety et al. ................... 73/659 |
| 6,260,004 B1 | | 7/2001 | Hays et al. |
| 6,321,602 B1 | * | 11/2001 | Ben-Romdhane ............ 73/660 |
| 6,434,512 B1 | | 8/2002 | Discenzo |
| 6,694,285 B1 | * | 2/2004 | Choe et al. ................ 702/182 |

* cited by examiner

FOREIGN PATENT DOCUMENTS

WO    WO 03/016823    2/2003

OTHER PUBLICATIONS

International Search Report, Feb. 12, 2004 International Searching Authority.

*Primary Examiner*—John E. Barlow, Jr.
*Assistant Examiner*—Hien Vo
(74) *Attorney, Agent, or Firm*—Robert F. Delbridge

(57) ABSTRACT

This invention is a method to determine the condition of rotating equipment, namely drive spindles, to enable the timely maintenance or replacement of same. The method uses an electrical signal from a vibration sensor mounted on part of the drive train to measure the level of vibration energy when the equipment is rotating under loaded and unloaded conditions. The relative vibration under the loaded and unloaded conditions is used as an indicator of equipment condition. Typically there is more vibration under load when the equipment is in good condition. When the level of vibration under the no-load condition matches or exceeds that seen under load, the equipment needs to be serviced or replaced.

20 Claims, 7 Drawing Sheets

DIAGNOSTIC METHOD FOR PREDICTING MAINTENANCE REQUIREMENTS IN ROTATING EQUIPMENT

FIELD OF THE INVENTION

This invention relates to monitoring of wear conditions on rotating shaft equipment in a plant environment, such as drive spindles for work rolls to reduce the thickness of cast metal slabs. It will however be understood that the invention will likewise find application for monitoring other types of rotating equipment, such as fans, motors, roll out tables, pumps, etc.

BACKGROUND OF THE INVENTION

It is common practice to monitor the spindles on rolling mills to avoid catastrophic spindle failures and resultant damage. Commonly, the spindles are monitored and replaced according to a time-based system. This, however, can prove inaccurate, as the wear on the spindles is dependent on loads and utilization, which, in a plant environment, is continually changing. Therefore, spindles may fail before their scheduled replacement time due to increased loads or other problems that increase the rate of wear. In addition, spindles may be replaced prematurely, simply because the scheduled replacement date has arrived. This results in a decrease in productivity, as well as increased maintenance costs.

Another method currently available for monitoring spindle wear is a wireless torque monitoring system. While effective, this system is costly and, therefore, users often find it too expensive to justify its implementation in large plant environments. Also, within plant environments, there is such significant damage to these systems that continuous replacement make them impractical.

One of the objects of this invention is to provide a relatively inexpensive, method to continuously monitor the condition and wear of rotating equipment using of the shelf equipment. A benefit is reduction in labour during routine maintenance while giving an early warning of a change in operating conditions which may warrant further inspection and the eventual replacement of failing equipment.

SUMMARY OF THE INVENTION

In accordance with the invention, there is provided a diagnostic method for predicting maintenance requirements in rotating equipment normally operating in loaded and unloaded conditions, the method including the following steps: coupling a sensor to apparatus associated with said rotating equipment, said sensor being responsive to vibration in said apparatus to generate an electric signal; obtaining a load signal from apparatus associated with said rotating equipment which is indicative of whether the rotating equipment is loaded; sampling said electric signal when the rotating equipment is loaded over a predetermined sampling period of time to obtain a loaded electric signal Vl; sampling said electric signal when the rotating equipment is unloaded over a predetermined sampling period of time to obtain an unloaded electric signal Vμ; and periodically displaying the relative magnitude between said loaded electric signal Vl and said unloaded electric signal Vμ over an extended maintenance period of time, a maintenance inspection being required when the magnitude of the unloaded electric signal Vμ exceeds the magnitude of said loaded electric signal Vl.

BRIEF DESCRIPTION OF THE DRAWINGS

In order to better understand the invention, a preferred embodiment is described below with reference to the accompanying drawings, in which:

FIG. 2b is a similar plot to FIG. 2a drawn over a shorter period of time for an unloaded data point of FIG. 2a;

FIG. 3b is a similar plot to FIG. 3a drawn over a shorter period of time for an unloaded data point of FIG. 3a;

DESCRIPTION OF PREFERRED EMBODIMENT

The invention will be described with reference to a specific application for monitoring the condition of drive spindles used in a hot strip mill used in the production of flat rolled steel. It will be understood that the invention may find applications in other environments which include rotating equipment that operates in loaded and unloaded conditions. In the case of this invention, Rotating Equipment can be defined as any equipment consisting of a power source, a transmission medium and a power sink.

Figure 1:
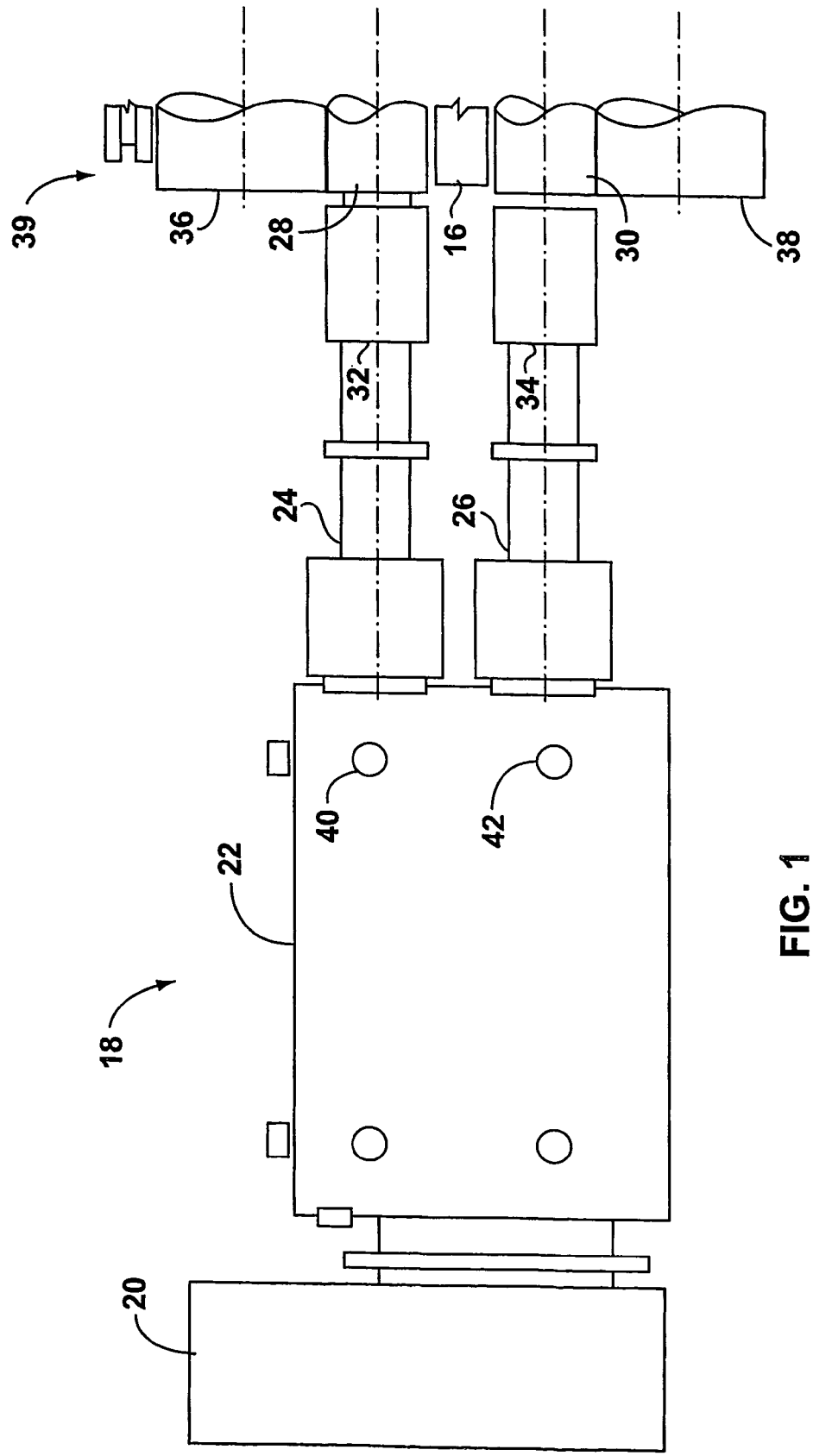
FIG. 1 is a diagrammatic sketch of a drive train for a mill roll stand.

In a finishing mill rolling process of a hot strip mill shown schematically in FIG. 1, hot strip steel is threaded through and is reduced in thickness by several mill stands, which are individually driven. The rotating speed of mill drives increases as strip progresses through the process. The steel 16 is compressed and rolled out as it travels through each mill stand to achieve the desired gauge, shape, and length.

A typical drive train 18 is described with reference to FIG. 1. A motor 20 drives a set of two identical pinion gears (not shown) in a gearbox 22, which are connected to two (top, bottom) drive spindles 24, 26. Top and bottom work rolls 28, 30 are inserted into roll end casings 32, 34 of the drive spindles 24, 26 and are driven by the drive train 18. A set of work rolls 28, 30 then become the driving force for larger backup rolls 36, 38 as force is applied to the roll stack by screws on the top of the mill 39.

Power is provided to two sensors 40, 42 mounted to the pinion gear box 22 at spaced locations adjacent to the associated pinion gears (not shown). The sensors are preferably accelerometers such as Wilcoxon Research, Model 793, 100 m V/g Nom but velometers such as Entek IRD, Model 9100V0 100 mV/g are also acceptable. Crystals in the sensors are excited by vibration at the gearbox, which induces a voltage signal. The voltage signal received from the sensors is sent to a data acquisition computer (not shown) i.e., a standard personal computer with an analog to digital input card. Software is used to extract the desired information from the raw voltage signal.

In accordance with this invention, one may ignore the conversion of voltage signals to engineering units, and instead, directly use the electrical (voltage) signal the crystal produces as raw data. It was found that rotational equipment, such as drive spindles used in the finishing mill section of a hot strip mill, shows a voltage signal that changes depending on the equipment's state and condition. While the electric voltage signal generated by the crystal is not characteristic of a specific mode of vibration, it is an energy signal with a pre-selected frequency range. These signals are filtered to limit their range of response using an analog low pass filter with a cut-off frequency of typically 200 Hz. These signals are sampled at typically 1 khz using standard analog to digital hardware and a personal computer. In this particular case, the slower the equipment rotates, the lower the cut-off value.

Figure 2A:
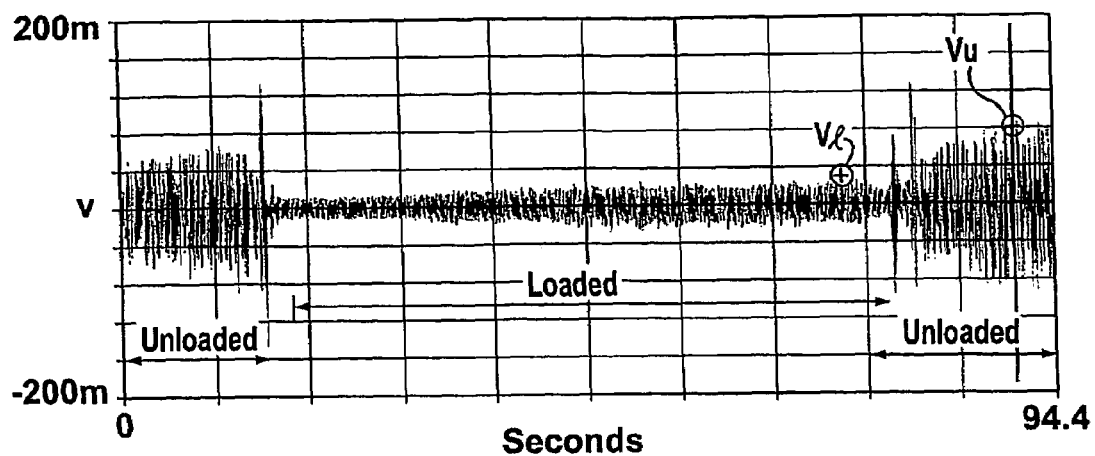
FIG. 2a is a plot showing raw sensor data in millivolts collected from a piezoelectric sensor mounted to a pinion gear box against time in seconds showing a worn spindle signature.

FIG. 2a shows an idealized plot of the voltage signal obtained from a single sensor 40 over a period of time of 94.4 seconds for a worn spindle. It will be observed that there is a portion of the voltage signal plot which has smaller amplitude corresponding to the situation where the work piece is in the mill and the spindle is loaded. A representative data point Vl is labelled which corresponds to the loaded electric signal reading. The portion of the voltage signal plot which has greater amplitude corresponds to the situation where the work piece has exited the mill and the spindle is unloaded. A representative data point Vμ is labeled which corresponds to the unloaded electric signal reading.

For the purposes of comparing vibration during loaded and unloaded conditions, automatic triggers are used to determine the start of the loaded condition and the unloaded condition. The time associated with the loaded condition is the ten-second sampling time interval at the end of a coil just prior to the piece exiting the mill. The time associated with the unloaded condition is the ten seconds sampling time interval after the work piece has left the mill and the mill is running at a constant idle speed.

Figure 2B:
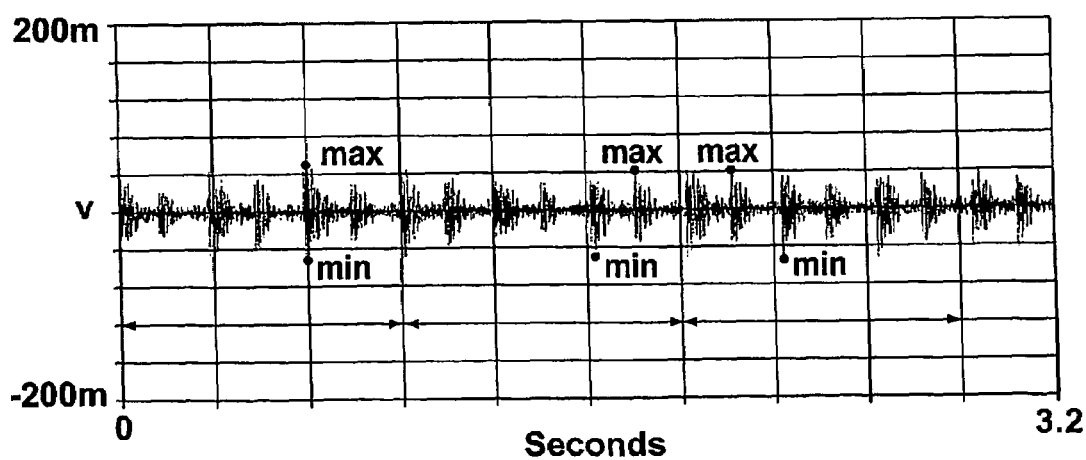

FIG. 2b shows an expanded view over a 3.2 second interval of data point Vμ in FIG. 2a. Impacting occurs at the rotating frequency of the spindle. The spindle impacting is a result of looseness, which results in increased amplitude in the voltage signal received. This looseness shows up clearly after the steel exits the mill and the spindles are no longer held tight on the roll end by the force applied to the roll stack.

Loaded Vl and unloaded Vμ vibration values are calculated by taking the range of the average maximum and the average minimum values over the ten second sampling intervals in question.

The calculation of Vl and Vμ for each workpiece is as follows:

Record the minimum and maximum voltage signal values for a chosen time window, (a typical time window being 1 second, containing approximately 1000 raw signal data points). As will be seen from FIG. 2b, the voltage signal trace has a series of peaks and valleys.

Calculate a population average value of all the minimum and maximum voltage signal values Ap for a pre-selected aggregate number of time windows within the chosen sampling time interval, (typically 10 time windows each containing 1 minimum and one maximum voltage signal value n=20).

Calculate an average Amax of all the points greater than Ap for each sampling time interval.

Calculate an average Amin of all the points less than Ap for each sampling time interval.

Calculate the Range of the average minimum Amin and maximum Amax voltage signals subtracting Amax from Amin to obtain a value Vμ corresponding to the unloaded condition shown in FIG. 2a.

Repeat the above steps to obtain a value Vl corresponding to the loaded condition shown in FIG. 2a.

The Amax and Amin are a measure of the average energy in the signal within a selected sampling time interval. One set of measurements must be taken when there is load on the spindle, and a second set of measurements is taken when the spindle is unloaded. A loaded condition is defined to occur when the equipment is performing work, while an unloaded condition refers to when the equipment is in an idling state and not performing work. These measurements are taken at steady state.

A condition index I is then calculated by taking the natural logarithm of the ratio of the loaded to unloaded vibration values.

$$I = \ln \frac{Vl}{V\mu}$$

The failure mode being monitored is wear in the roll end casing of the spindles 24, 26, which are a spline fit. The theory behind the analysis method is that in a healthy spindle, vibration recorded at the sensor location should be greater in amplitude in the top speed, fall load condition than when the mill speed is reduced with no load applied. Because Vl is less than Vμ for the spindle being monitored in FIG. 2a, the condition index I has a negative value and generates an alarm.

Figure 3A:
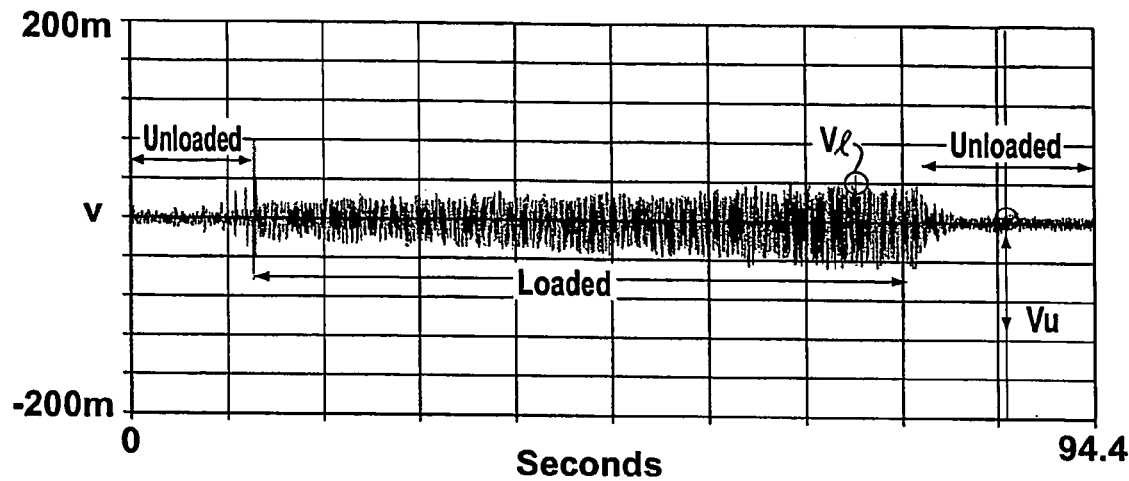
FIG. 3a is a similar plot to FIG. 2a after replacement of a spindle showing a new spindle signature.
Figure 3B:
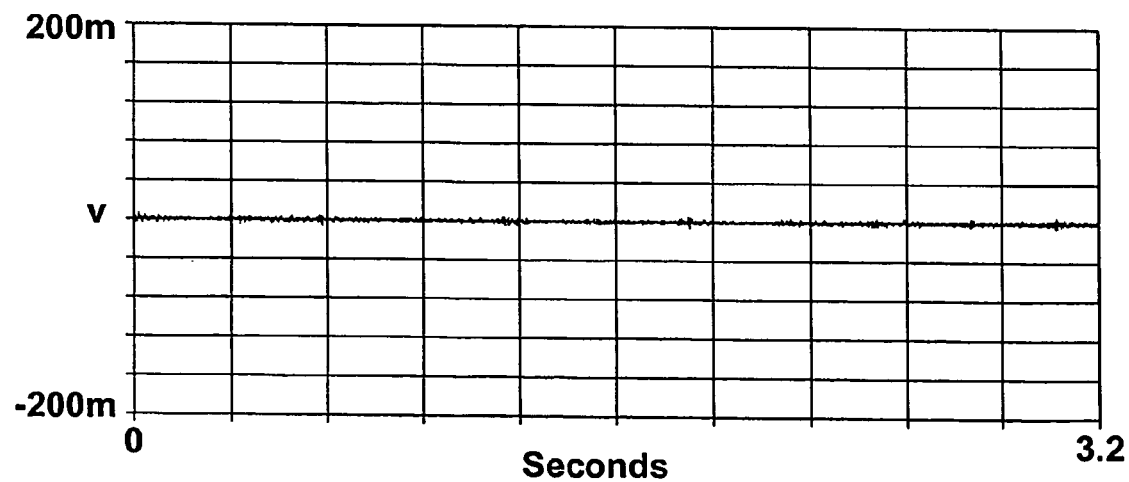

FIG. 3a shows an idealized plot of the voltage signal obtained from a single sensor 40 over a period of time of 94.4 seconds for a new replacement drive spindle 24. It will be observed that there is a portion of the voltage signal which has greater amplitude which corresponds to the situation where the work piece is in the mill and the spindle is loaded. A representative data point Vl is labeled. The portion of the voltage signal which has smaller amplitude corresponds to the situation where the work piece has exited the mill and the spindle is unloaded. An expanded view of the unloaded portion over a period of 3.2 seconds is shown in FIG. 3b. The condition index I calculated for the replacement spindle will show a positive value since Vl is greater than Vμ thus indicating that the spindle change was successful and an alarm would no longer be generated.

Figure 4:
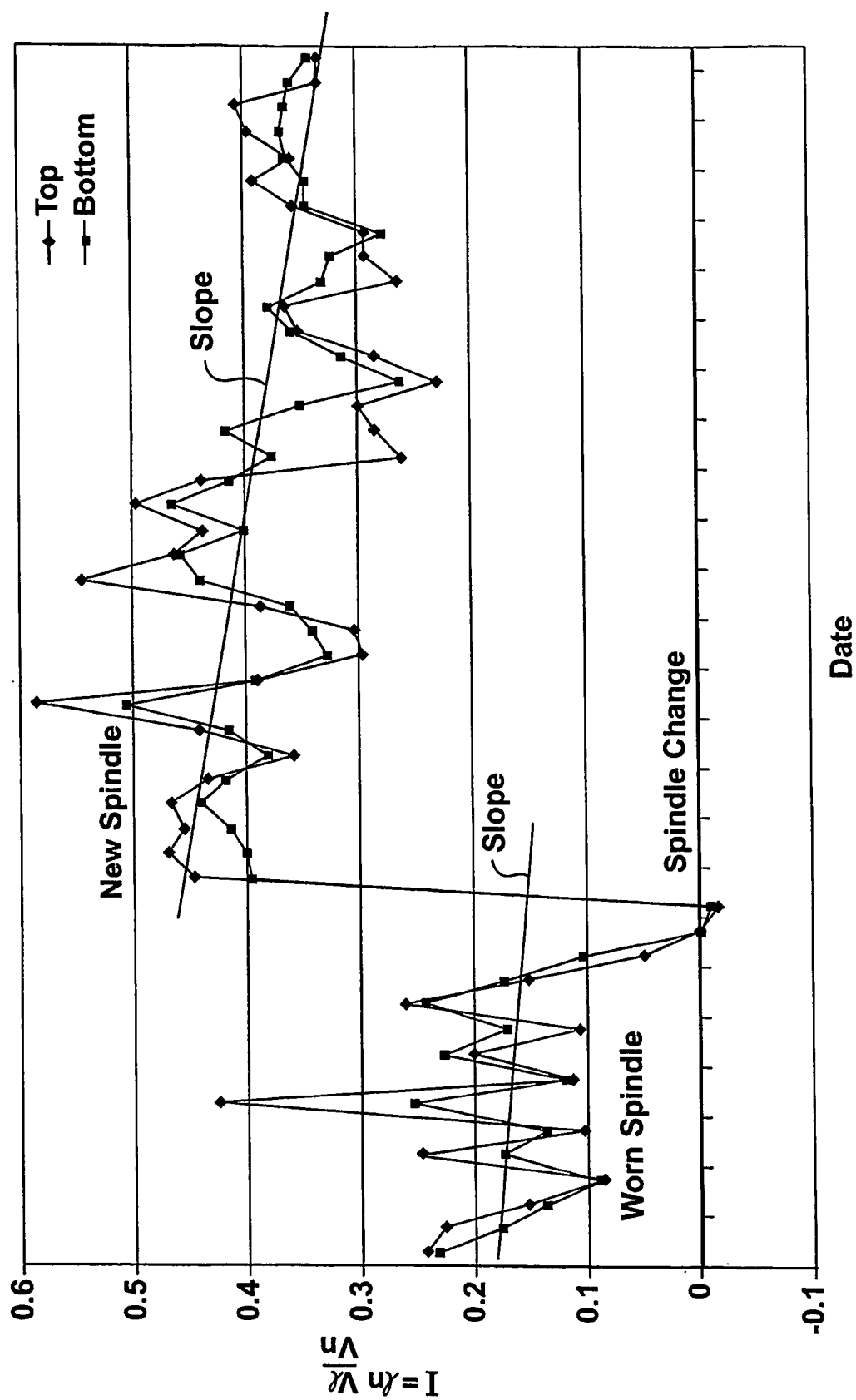
FIG. 4 is a performance chart for the mill stand of FIGS. 2 and 3 plotting values of condition index I over a period of six weeks.

The performance chart of FIG. 4 shows calculated daily averages of the condition index I. Data shows deterioration of spindle 24 resulting in a negative chart value. At the point of alarm (zero) an email is automatically sent to alert the required personnel, and a detailed vibration analysis is completed. A decision is made based on this information to change the spindle set at the next maintenance opportunity. In this example, the spindle wore out very rapidly at the end. This is normally not as rapid and can typically be allowed to slip to a condition index value, I, of −0.2 before true catastrophic failure. This spindle was changed due to a maintenance opportunity. Normally a spare would be ordered after remaining at 0 for more than three days and there would still be a couple of months of useful life left in the spindle (even in the faster stands near the exit of the mill which wear more rapidly than the slower stands at the entry).

The rate of change in the value of the condition index I on the performance chart is also a factor in evaluating the urgency of a problem. The new spindles show a positive daily calculated chart value of approximately 0.4 as illustrated in FIG. 4, indicating that a reliable spindle set is operating in the mill stand.

The slope of the chart generated from a new spindle after a few weeks of service can be extrapolated to the zero point to provide an indication of remaining spindle life.

As a supplementary early warning feature, the direction of the slope taken through the charted daily values of FIG. 4 can change due to abnormalities in the drive train. If there is a mechanical problem present, the trend will change up or down depending on the problem. If the slope trends down due to increases in unloaded vibration, there is either mechanical looseness in the spindles or roll set defects present. If the slope trends up due to increases in loaded vibration, there are either gearset problems, pinion bearing defects, lubrication defects in the pinion box, or roll set defects. Recognition of these events will trigger detailed vibration analysis. Once any abnormalities are corrected, the trend will return to the normal slope/pattern of the spindle.

Figure 5:
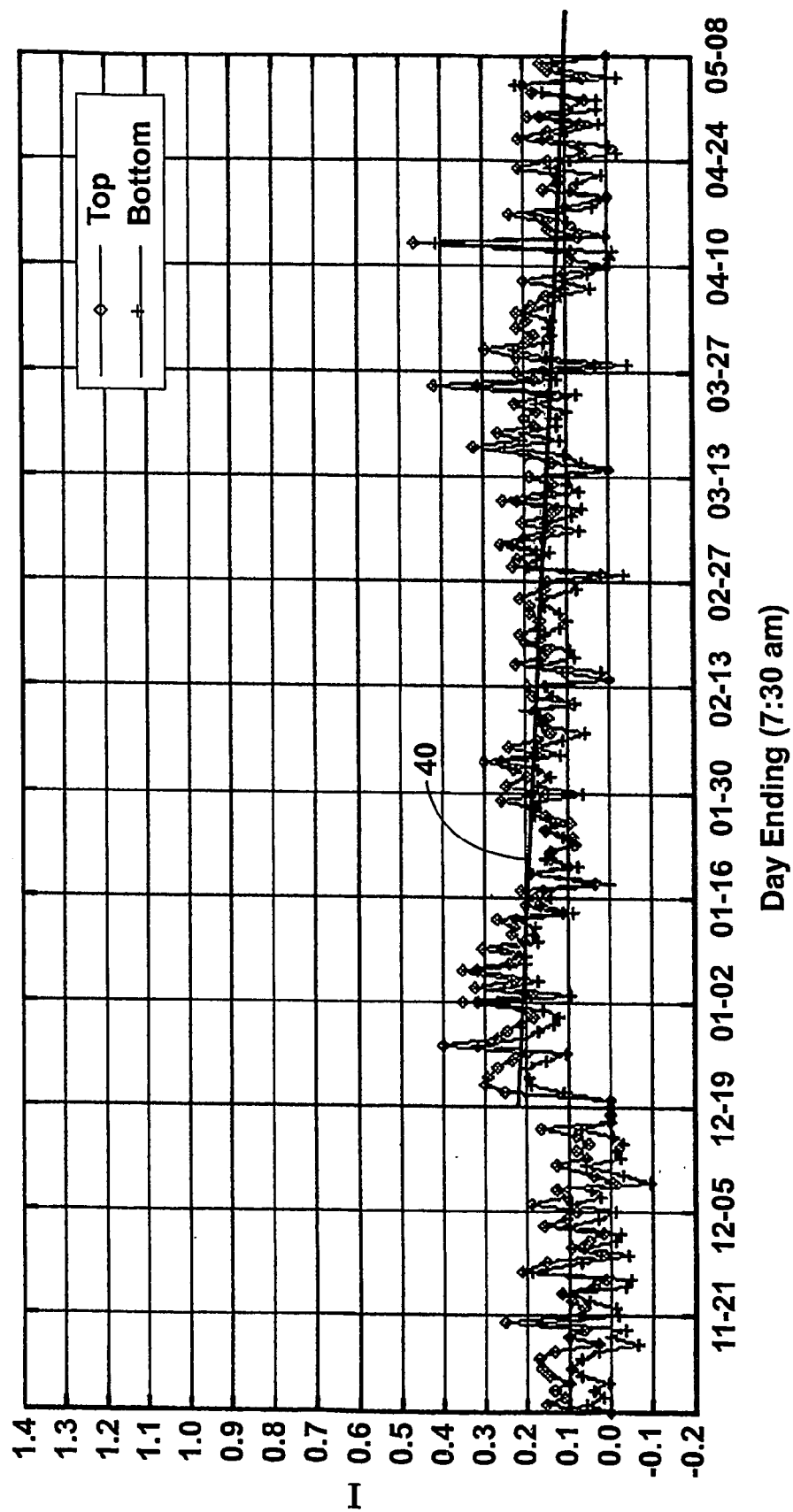
FIG. 5 is a performance chart for a mill stand showing normal behaviour after a spindle replacement.

The performance chart shown in FIG. 5 of the accompanying drawings shows a slow and predictable slope 40 after installation of a reconditioned set of spindles. While the scheduled replacement time had expired, the chart indicates that ample service life remains of up to one year.

Figure 6:
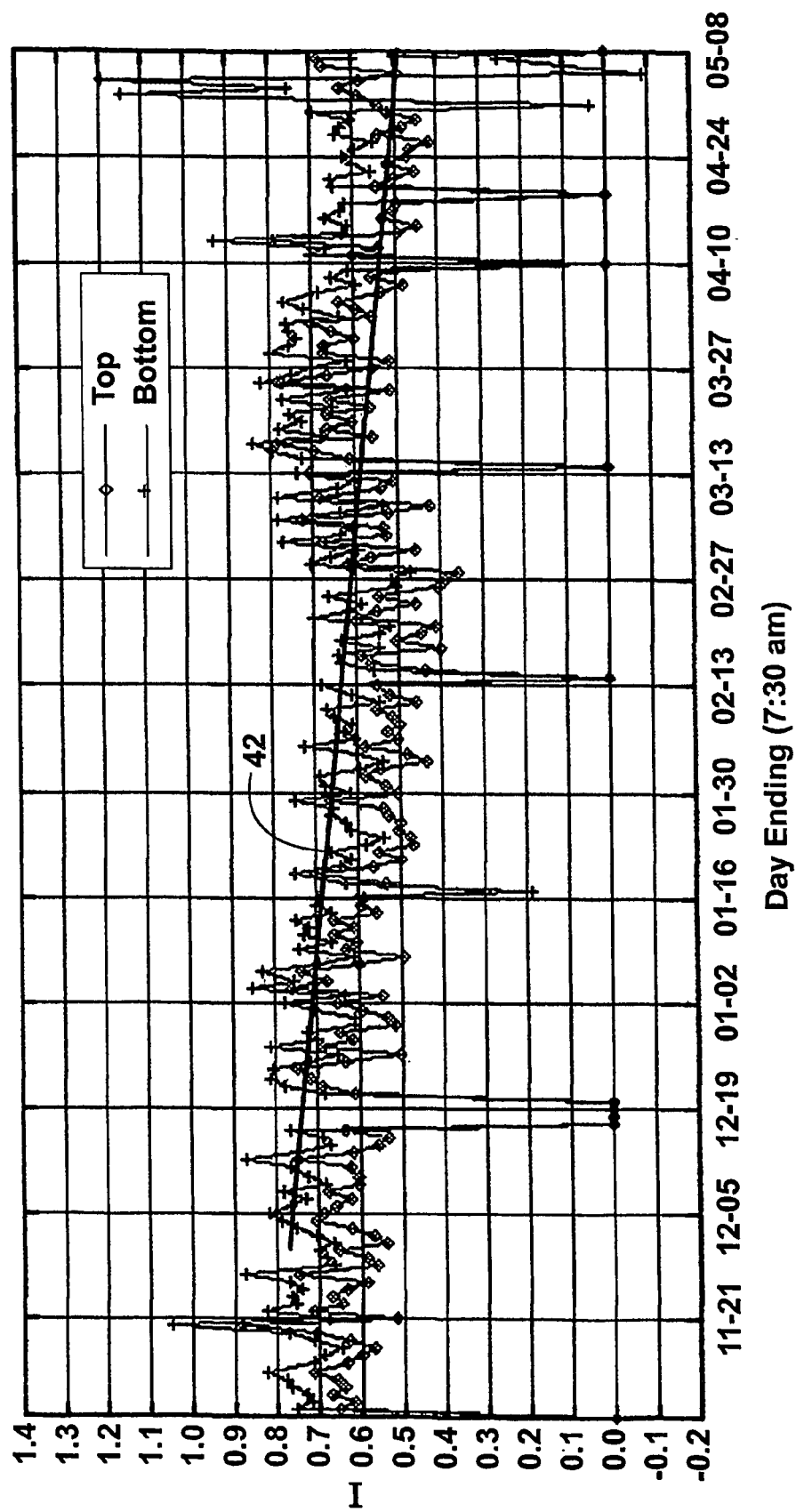
FIG. 6 is a performance chart for a mill stand showing mechanical problems observed in a gear box.

The performance chart shown in FIG. 6 of the accompanying drawings shows slow predictable wear of spindles with a removal prediction of several years. There are mechanical problems observed in the gearbox which cause the slope 42 to move upwardly and change pattern.

Figure 7:
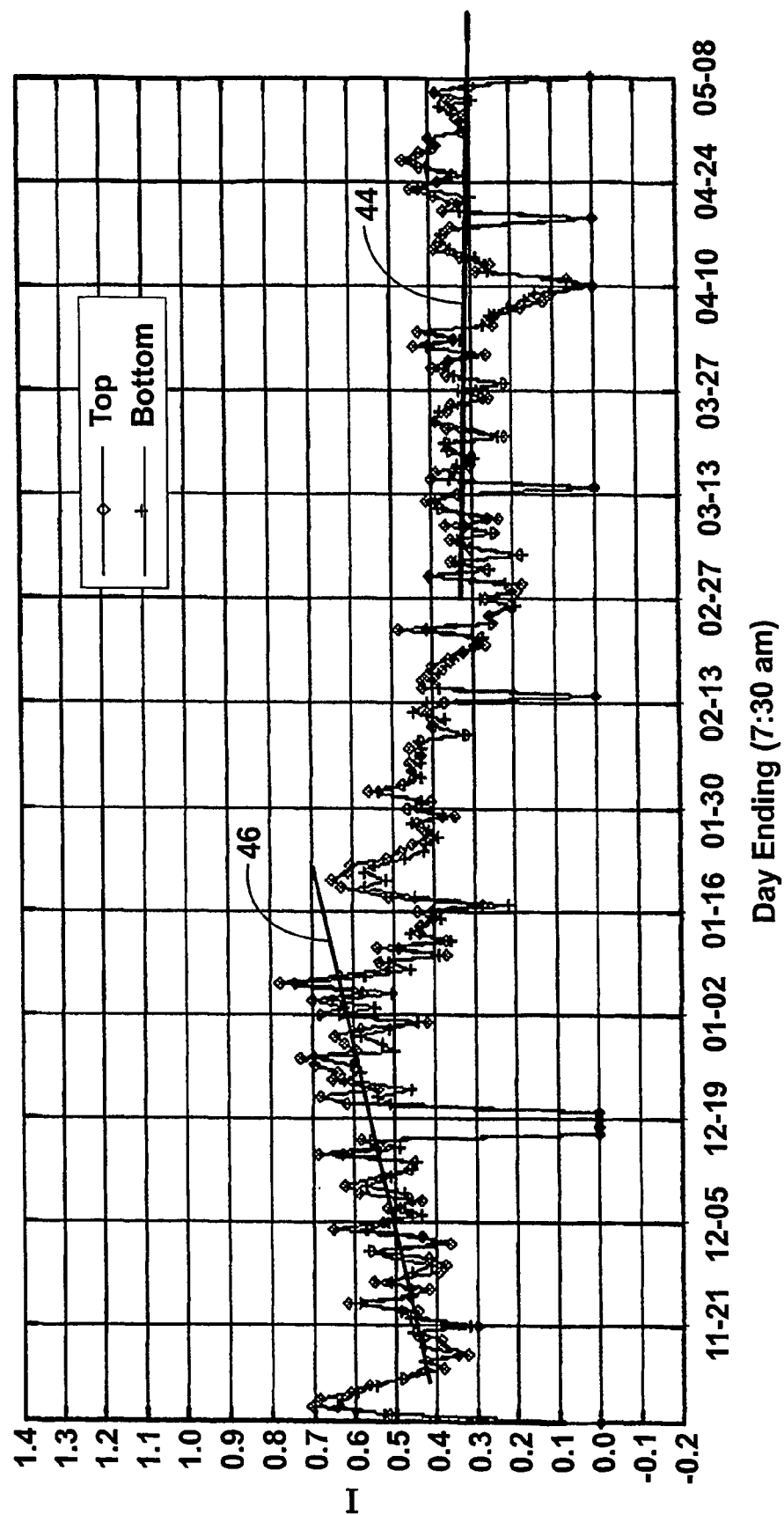
FIG. 7 is a performance chart for a mill stand showing normal behaviour after a lubrication correction.

The performance chart shown in FIG. 7 of the accompanying drawings shows a generally downward slope 44 indicative of basic wear in the drive train. The upward slope 46 at the beginning of the chart is indicative of a problem on the driver side which was corrected by lubrication. The predicted inspection deadline for determining the remaining service life of the pinions expires in several years.

Once any problem is detected, a full analysis would have to be conducted using real time diagnostic vibration techniques. This cannot be done all of the time, because it takes too long to process the data in real time. However, by limiting which stands require the complete vibration monitoring system analysis, the user can save time and money.

Thus, the value of the condition index I is correlated with the equipment condition. The condition index can be used in various ways, either to determine long term incipient conditions and/or to determine short term effects that may not be specific to the long term spindle condition. A threshold value for the condition index is developed within the condition index, in which the condition of the equipment is deemed a normal and acceptable operating condition. If the condition index falls below this predetermined value a warning is issued.

Thus, two pieces of data are extracted, one when the equipment is placed under load and a second when the equipment is unloaded.

This method provides a basis for an effective condition based monitoring system, since rotating equipment in good condition typically exhibits more vibration under a loaded condition than in the unloaded idling state. If the converse is true, this is indicative of poor equipment condition.

The invention claimed is:

1. A diagnostic method for predicting maintenance requirements in rotating equipment normally operating in loaded and unloaded conditions, the method including the following steps;

coupling a sensor to apparatus associated with said rotating equipment, said sensor being responsive to vibration in said apparatus to generate an electric signal;

obtaining a load signal from apparatus associated with said rotating equipment which is indicative of whether the rotating equipment is loaded;

sampling said electric signal when the rotating equipment is loaded over a predetermined sampling time interval to obtain a loaded electric signal Vl;

sampling said electric signal when the rotating equipment is unloaded over a predetermined sampling time interval to obtain an unloaded electric signal $V\mu$; and periodically displaying the relative magnitude between said loaded electric signal Vl and said unloaded electric signal $V\mu$ over an extended maintenance period of time, a maintenance inspection being required when the magnitude of the unloaded electric signal $V\mu$ exceeds the magnitude of the loaded electric signal Vl.

2. A diagnostic method according to claim 1 in which the sensor is selected from the group comprising a velometer and an accelerometer.

3. A diagnostic method according to claim 1 in which the electric signal generated is either current or voltage.

4. A diagnostic method according to claim 1 in which the sensor includes a piezoelectric crystal.

5. A diagnostic method according to claim 1 in which the rotating equipment is a drive spindle for a work roll and the load signal is indicative of whether the work roll is applying pressure to a work piece or whether the work piece has exited the work roll.

6. A diagnostic method according to claim 1 in which the electric signal is sampled during a sampling time interval selected to correspond to a predetermined vibration frequency range.

7. A diagnostic method according to claim 6 in which the predetermined vibration frequency range during which the electric signal is sampled is 0 to 150 Hz for rotating equipment rotating at less than 100 revolutions per minute.

8. A diagnostic method according to claim 6 in which the predetermined vibration frequency range during which the electric signal is sampled is 0 to 200 Hz for rotating equipment rotating at up to 700 revolutions per minute.

9. A diagnostic method according to claim 6 in which the predetermined vibration frequency range during which the electric signal is sampled is 0 to 500 Hz for rotating equipment rotating at more than 1000 revolutions per minute.

10. A diagnostic method according to claim 1 in which the loaded electric signal Vl is sampled over a time interval of 10 seconds during which the rotating equipment is fully loaded.

11. A diagnostic method according to claim 1 in which the unloaded electric signal $V\mu$ is sampled over a time interval of 10 seconds during which the rotating equipment is unloaded.

12. A diagnostic method according to claim 1 in which sampling of the unloaded electric signal $V\mu$ begins a predetermined period of time after the load signal indicates that the rotating equipment is not loaded.

13. A diagnostic method according to claim 1 in which the loaded and unloaded electric signals Vl and $V\mu$ correspond to the maximum electric readings taken during said predetermined sampling time interval.

14. A diagnostic method according to claim 1 in which electric readings corresponding to the loaded and unloaded electric signals Vl and Vμ are averaged during said predetermined sampling time interval to generate an average electric signal.

15. A diagnostic method according to claim 14 in which an alert signal corresponding to the arithmetic ratio R between electric readings corresponding to Vl and Vμ is generated and displayed visually.

16. A diagnostic method according to claim 15 in which a daily average of the arithmetic ratio R is plotted over time.

17. A diagnostic method according to claim 16 in which the slope of the plot is monitored.

18. A diagnostic method according to claim 15 in which the natural logarithmic of the ratio R is plotted over time.

19. A diagnostic method according to claim 18 in which the slope of the plot is monitored.

20. A diagnostic method for predicting maintenance requirements in rotating equipment normally operating in loaded and unloaded conditions, the method including the following steps;

coupling a sensor to apparatus associated with said rotating equipment, said sensor being responsive to vibration in said apparatus to generate an electric signal;

obtaining a load signal from apparatus associated with said rotating equipment which is indicative of whether the rotating equipment is loaded;

calculating a range of average maximum and average minimum electric signal readings over a pre-selected sampling time interval for rotating equipment in a loaded condition;

calculating a range of average maximum and average minimum electrical signal readings over a pre-selected sampling time interval for rotating equipment which is not loaded;

calculating the natural log of the ratio of an average loaded to average unloaded range value to define a condition index;

periodically displaying the condition index over an extended maintenance period of time, a maintenance inspection being required when the condition index falls below a predefined threshold.

* * * * *